UNITED STATES PATENT OFFICE.

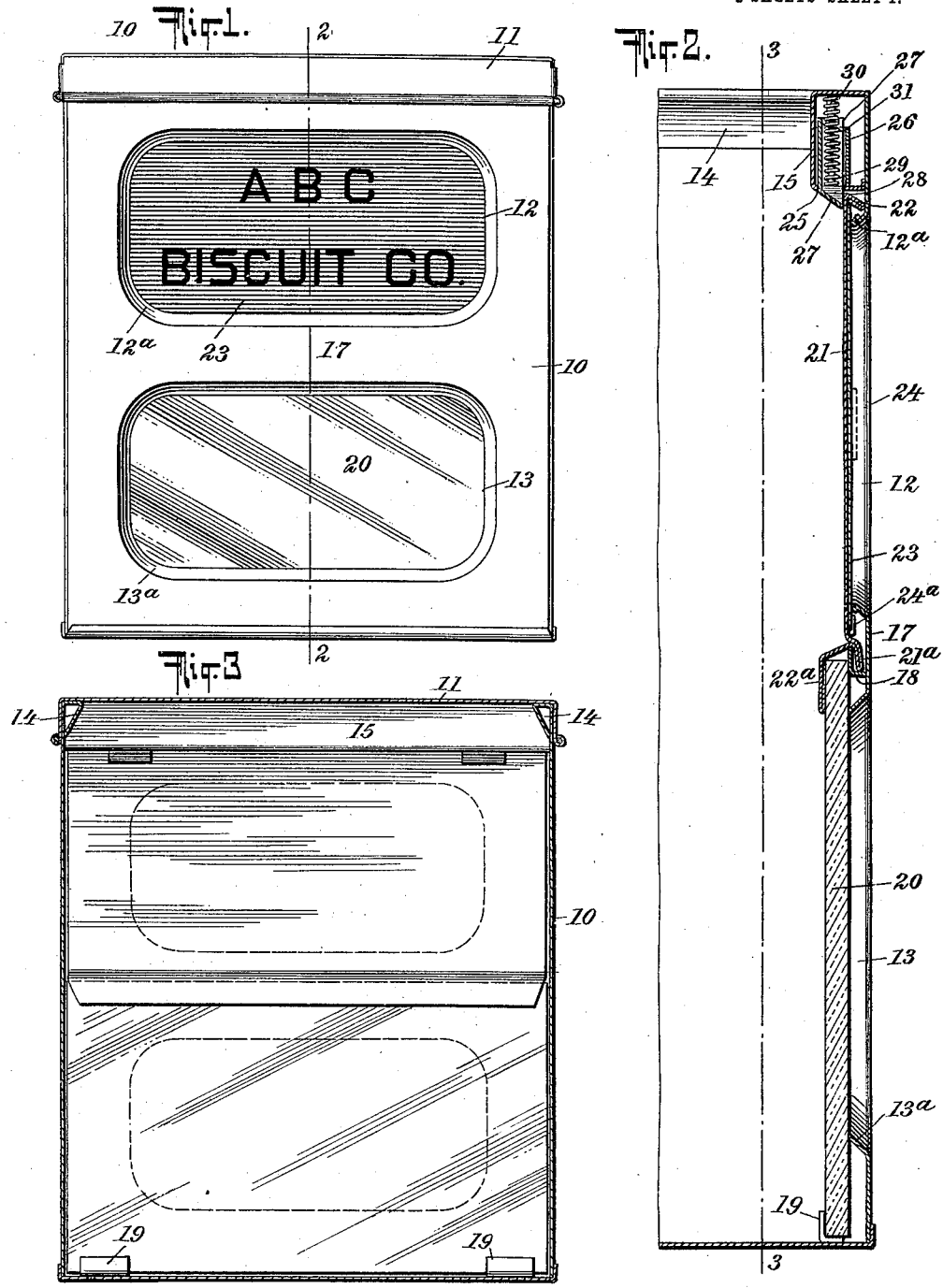

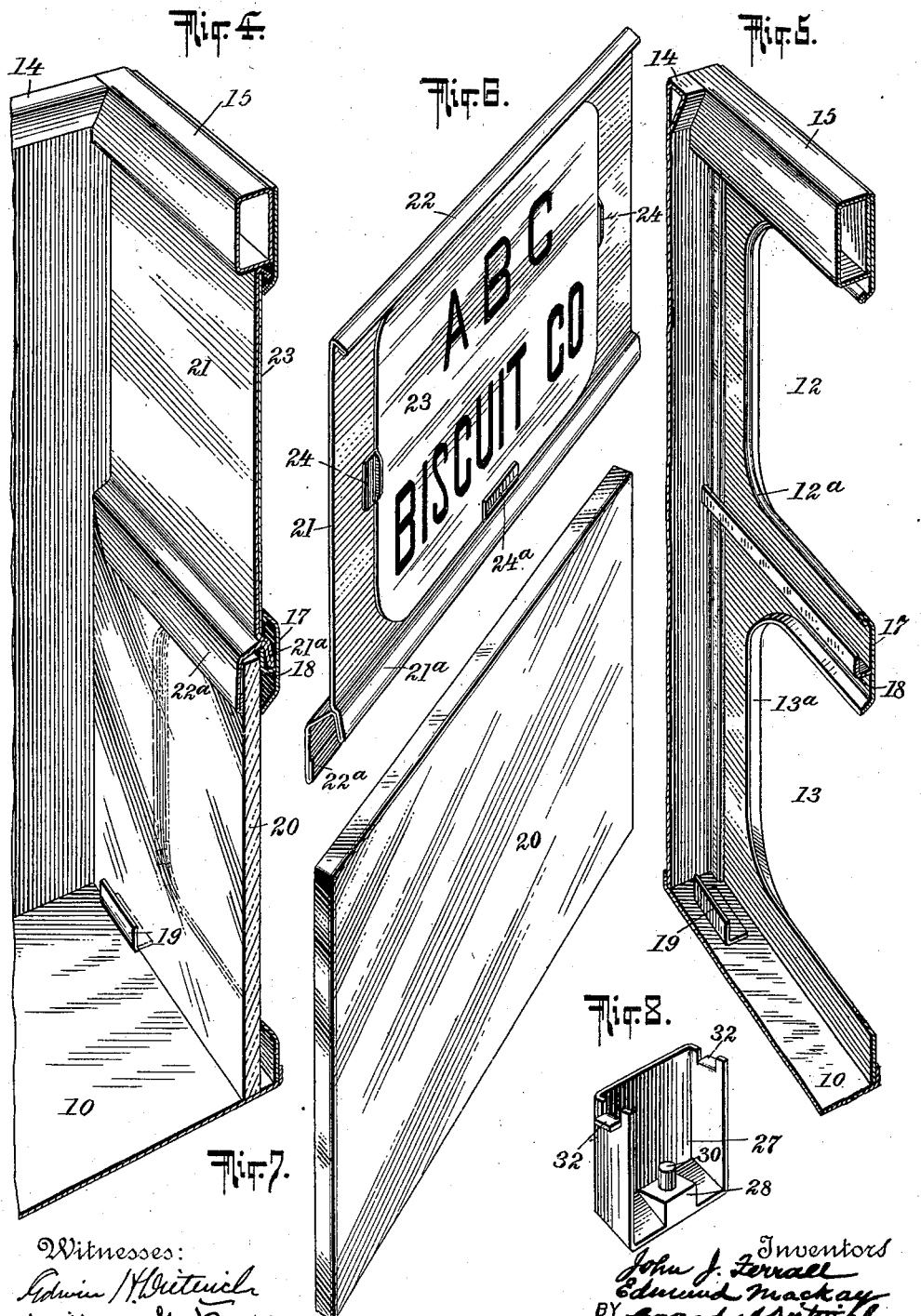

JOHN J. FERRALL AND EDMUND MACKAY, OF NEW YORK, N. Y., ASSIGNORS TO NATIONAL BISCUIT COMPANY, A CORPORATION OF NEW JERSEY.

STORAGE AND DISPLAY RECEPTACLE.

996,574.      Specification of Letters Patent.    Patented June 27, 1911.

Application filed March 22, 1910. Serial No. 550,923.

*To all whom it may concern:*

Be it known that we, JOHN J. FERRALL and EDMUND MACKAY, citizens of the United States, residing at the city of New York, borough of Manhattan, in the county and State of New York, have invented certain new and useful Improvements in Storage and Display Receptacles, of which the following is a full, clear, and exact specification.

Our invention relates to improvements in storage and display receptacles, and the same has for its object more particularly to provide a simple, efficient and reliable receptacle for storing and displaying crackers, cakes, and other articles.

Further, said invention has for its object to provide a sheet metal storage and display receptacle having openings therein adapted to receive a section of transparent material, and a name-plate to designate the character of the goods contained in the casing, the name of the manufacturer, or any other desirable information.

Further, said invention has for its object to provide a sheet metal display receptacle in which the name-plate may be conveniently changed at will.

Further, said invention has for its object to provide means for conveniently securing the name-plate and transparent section jointly in position within the receptacle.

Further, said invention has for its object to provide a storage and display receptacle in which the means for securing the transparent section, and the name-plate are so arranged and constructed that the same is not readily observable in order to prevent the tampering therewith or the removal of the name-plate or glass section.

Further, said invention has for its object to provide means for securing the transparent section and the name-plate within the receptacle, which means also serves to materially reinforce or stiffen the front of the receptacle adjacent to, and intermediate the openings in the front of the receptacle.

To the attainment of the aforesaid objects and ends, our invention consists in the novel details of construction, and the combination, connection and arrangement of parts hereinafter more fully described and then pointed out in the claims.

In the accompanying drawings forming part of this specification wherein like numerals of reference indicate like parts, Figure 1 is a front view, showing a form of receptacle constructed according to, and embodying our said invention; Fig. 2 is a detail vertical section on an enlarged scale taken on the line 2—2 of Fig. 1, showing the openings in the front of the can, the transparent section, the name-plate, and the means for securing the same jointly in position therein; Fig. 3 is a section taken on the line 3—3 of Fig. 2, showing the inner side of the receptacle front; Fig. 4 is an enlarged detail perspective view showing the front of the can, the openings therein, and the transparent portion and name-plate in position behind said openings; Fig. 5 is a view similar to Fig. 4, with the transparent portion and the name-plate removed therefrom; Fig. 6 is a detail perspective view, showing the name-plate detached from the receptacle; Fig. 7 is a detail perspective view of the transparent section removed from the receptacle, and Fig. 8 is an enlarged detail perspective view of one of the locking members, as seen from its inner side.

In said drawings, 10 designates the receptacle as a whole, which is preferably made of sheet metal and provided with a hinged cover or top 11. The front of the receptacle 10 is provided with two longitudinal openings 12 and 13, having depressed rims or edges 12ª, 13ª, respectively. The upper edges of the receptacle, at its opposite sides and back, are bent inwardly and downwardly, and secured to the inner surface of the sides and back to form angular stiffening ribs 14, 14, and the front of the receptacle is provided upon its inner side along its upper edge, and above the upper edge of the opening 12 therein, with a rectangular stiffening rib 15.

To the inner side of the web 17, which serves to divide the front of the receptacle into two longitudinal openings, is secured an inwardly and upwardly extending rib or member 18, which extends entirely across said front, and serves to stiffen or reinforce said front behind the web 17, and also serves as a support or attaching member for the parts hereinafter described.

Upon the bottom of the receptacle, adjacent to the inner edge of the lower opening 13, are secured upwardly extending clips 19, 19, adapted to receive the lower edge of a piece of glass or other suitable transparent material 20.

21 denotes a plate provided at its upper edge with a downwardly and forwardly inclined flange or rim 22. The lower edge of said plate 21 is bent slightly forward and downward and then doubled upon itself to form a depending projection 21$^a$, and the end of said plate 21 is then bent rearward and downward to form a second depending longitudinal projection 22$^a$, having its extreme edge bent forward and upward upon itself. The second depending projection 22$^a$ is made considerably deeper than the forward projection 21$^a$, in order that the same shall project to a considerable extent below the lower edge of said forward projection 21$^a$.

23 denotes a name-plate which is supported in position upon the front of the plate 21 intermediate the upper edge 22 thereof and the projection 21$^a$ at the base thereof, by short retaining sections or clips 24, 24, arranged upon said front of the plate 21 adjacent to the opposite ends of the name-plate 23, and an upwardly projecting clip 24$^a$ arranged at the lower edge of the plate 21. The vertical projecting edges of the retaining sections or clips 24, 24, extend only a slight distance beyond the outer surface of the name-plate 23 so as to permit of the ends of said name-plate being raised when sliding the same into position upon the plate 21, or removing the same therefrom.

The rectangular stiffening rib 15 arranged at the upper inner edge of the front of the receptacle is provided adjacent to its opposite ends with apertures 25, 25, and within the said rib and surrounding said apertures are arranged rectangular guides 26, 26, which are open at their tops and bottoms.

27, 27 denote bolts preferably made of sheet metal, and open at their forward or outer sides. The lower ends of said bolts 27, 27, are inclined downwardly and forwardly, and arranged centrally within said bolts upon their inclined lower ends are pedestals 28, 28, each provided with a stud 29. Upon the underside of the upper edge of the stiffening rib 15 are provided similar studs 30, 30, which are arranged in line with the studs 29, 29, on the bolts 27, 27, and 31, 31, denote coil springs disposed intermediate the inner upper surface of the stiffening rib 15 and the pedestals 28, 28 of said bolts, and have their ends in engagement with the studs 29 and 30, respectively, upon said bolts and stiffening rib 15. The sides of the bolts 27, 27, adjacent to the upper ends are provided with outwardly projecting members forming stops 32, 32, which are adapted to engage the upper edges of the guides 26, 26, at either side of said bolts, whereby to limit the downward or outward movement of said bolts within said guides 26, 26.

In securing a piece of glass and a name-plate in position within the casing, it merely becomes necessary to first insert the lower edge of the piece of glass 20 in position within the clips or retaining sections 19, 19, provided upon the bottom of the receptacle 10, and then bring the projection 22$^a$ into contact with the inner upper edge of the piece of glass 20, and the forward projection 21$^a$ into engagement with the inwardly and upwardly extending reinforcing rib or member 18 arranged upon the rear of the front of the receptacle intermediate the openings 12 and 13 therein. As soon as the projection 21$^a$ is in proper engagement with the stiffening or reinforcing rib 18, the upper edge of the plate 21 is pressed forwardly, and in so doing the forwardly and downwardly inclined upper edge thereof is caused to engage with the oppositely inclined lower edges of the bolts 27, 27, extending out of the horizontal rectangular stiffening rib 15 arranged at the inner upper edge of the front of the receptacle. As the upper edge of the plate 21 is pressed forwardly, the bolts 27, 27, will be forced inwardly until the plate 21 with its name-plate 23 thereon is firmly pressed against the inner edge of the flange or depressed rim 12$^a$ of the opening 12. As soon as the plate 21 is firmly in contact at its upper edge with the upper edge of the opening 12, the bolts 27, 27, will be projected by the action of the coil springs 31, 31, and hold said plate firmly in position within said receptacle, and at the same time cause the lower edge of said plate to hold the upper edge of the glass 20 firmly against the rear or upwardly projecting portion of the stiffening rib 18, and in position behind the lower horizontal opening 13 in the front of the receptacle.

It will be noted that by means of our improved construction, the piece of glass covering the lower opening 13, and the plate 21 covering the upper opening 12, are simultaneously secured in position by means of the bolts 27, 27, and that the means for securing the upper edge of the piece of glass, together with the plate 21, serve to materially reinforce or stiffen the front of the receptacle adjacent to, and surrounding the openings therein. By means of this construction and arrangement the cam or receptacle is materially strengthened or reinforced at the point or place which would otherwise be one of the weakest portions of the receptacle. Further, it will be noted that instead of providing a separate name-plate to be attached to the plate 21, the latter may be used for that purpose by applying a paper or other label directly to the plate 21, or painting, printing or otherwise marking the name or other matter directly upon the front of said plate.

Having thus described our invention, what we claim and desire to secure by Letters Patent is:

1. A receptacle of the character described having a plurality of openings therein, engageable means arranged upon the inner side of said receptacle between said openings, a covering section for one of said openings, retaining means for said covering section, a second covering section for the other of said openings, means arranged upon said second covering section adapted to engage one edge of said first-named covering section, and to secure the interengaging edges of said covering sections to said engageable means, and means for securing said covering sections in position over said openings, substantially as specified.

2. A receptacle of the character described having a plurality of openings therein, an engageable member arranged in said receptacle between said openings, a covering section for one of said openings, retaining means engaging said covering section along one edge, a second covering section for the other of said openings adapted to engage said engageable member, and to engage said covering section first-named along the other edge thereof, and locking means engaging said last-named covering section whereby to hold both of said covering sections in position over said openings, substantially as specified.

3. A receptacle of the character described having a plurality of openings therein, a rib intermediate said openings, a covering section for one of said openings, retaining means on the base of said receptacle adapted to engage said covering section along its lower edge, a second covering section for the other of said openings, means arranged at the lower edge of said second covering section adapted to engage said rib and the upper edge of said first-named covering section, and locking means engaging the upper edge of said second covering section whereby to hold both of said covering sections in position over said openings, substantially as specified.

4. A receptacle of the character described having a plurality of openings therein, a reinforcing rib secured to said receptacle intermediate said openings, a covering section for one of said openings, retaining means in said receptacle adapted to engage said covering section along its lower edge, a second covering section for the other of said openings, a groove section arranged along the lower edge of said second covering section adapted to receive the upper edge of said first-named covering section and said reinforcing rib, and spring-actuated locking means arranged in said receptacle adapted to engage the upper edge of said second covering section whereby to hold both of said covering sections locked in position over said openings, substantially as specified.

5. A receptacle of the character described having a plurality of parallel openings therein, a reinforcing rib secured upon the inner side of said receptacle intermediate said openings, a covering section for one of said openings, retaining means arranged in said receptacle adapted to engage said covering section at its lower edge, a second covering section for the other of said openings, a groove section arranged along the lower edge of said second covering section adapted to receive the upper edge of said first-named covering section and said reinforcing rib, and spring-actuated locking means arranged within said receptacle adjacent to its upper edge adapted to engage the upper edge of said second covering section, whereby to hold both of said covering sections locked in position over their respective openings, substantially as specified.

6. A receptacle of the character described having a plurality of openings therein arranged side by side, a reinforcing rib secured within said receptacle intermediate said openings, a transparent covering section for one of said openings, retaining means arranged in said receptacle adapted to engage said transparent covering section along its lower edge, a second covering section for the other of said openings, means arranged along the lower edge of said second covering section adapted to engage said reinforcing rib, and means adapted to receive the upper edge of said transparent covering section, a housing arranged in said receptacle adjacent to its upper edge, spring-actuated locking devices arranged in said housing adapted to engage the upper edge of said second covering section, whereby to hold both of said covering sections in position over their respective openings, substantially as specified.

7. A receptacle of the character described having a plurality of longitudinal openings therein, a member separating said openings, a reinforcing rib secured upon the inner side of the member separating said openings, an upwardly projecting section on said reinforcing rib, a transparent covering section for one of said openings, retaining means arranged at the base of said receptacle adapted to engage said transparent covering section at its lower edge, a second covering section for the other of said openings, a depending projection arranged along the lower edge of the said second covering section adapted to engage with the upwardly projecting section of said reinforcing rib, a second depending section arranged along the lower edge of said second covering section adapted to receive the upper edge of said transparent covering section, a housing arranged in said receptacle adjacent to its upper edge, and a plurality of spring-actuated locking devices arranged in said housing adapted to engage the upper edge of said second covering section, whereby to hold both of said covering sections locked in position over their respective openings, substantially as specified.

8. A receptacle of the character described having a plurality of longitudinal openings therein, a member separating said openings, a reinforcing rib secured upon the inner side of the member separating said openings, an upwardly projecting section on said reinforcing rib, a transparent covering section for one of said openings, retaining means arranged at the base of said receptacle adapted to engage said transparent covering section at its lower edge, a second covering section for the other of said openings, a plurality of separated, parallel, depending projections arranged at the lower edge of said second covering section, one of said projections being adapted to engage with the upwardly projecting section of said reinforcing rib, and the other of said depending projections adapted to engage the upper edge of said transparent covering section, an inclined projection extending from the upper edge of said second covering section, and a plurality of locking devices arranged in said receptacle adjacent to its upper edge adapted to engage the inclined upper edge of said second covering section, whereby to hold both of said covering sections locked in position over their respective openings, substantially as specified.

9. A receptacle of the character described having a plurality of longitudinal openings therein, an upwardly projecting member arranged upon the inner side of said receptacle intermediate said longitudinal openings, a transparent covering section for one of said openings, retaining means arranged adjacent to the lower edge of said transparent covering section adapted to engage the same, a second covering section for the other of said openings, a plurality of parallel, depending projections arranged along the lower edge of said second covering section, one of said projections being adapted to engage with said upwardly projecting member, and the other of said depending projections adapted to engage the upper edge of said transparent covering section, a name plate arranged upon said second covering section, means for maintaining said name plate in position upon said second covering section, and locking means arranged in said receptacle adjacent to its upper edge adapted to engage the upper edge of said second covering section whereby to hold both of said covering sections and said name plate in position within said receptacle, substantially as specified.

Signed at the city of New York, in the county and State of New York, this 23rd day of February, nineteen hundred and ten.

JOHN J. FERRALL.
EDMUND MACKAY.

Witnesses:
H. H. HUNGERFORD,
CONRAD A. DIETERICH.

Copies of this patent may be obtained for five cents each, by addressing the "Commissioner of Patents, Washington, D. C."